June 11, 1940.  J. W. SCHWAB ET AL  2,203,881
SOLIDIFICATION OF SANDY SOILS
Filed Dec. 2, 1937  5 Sheets-Sheet 2
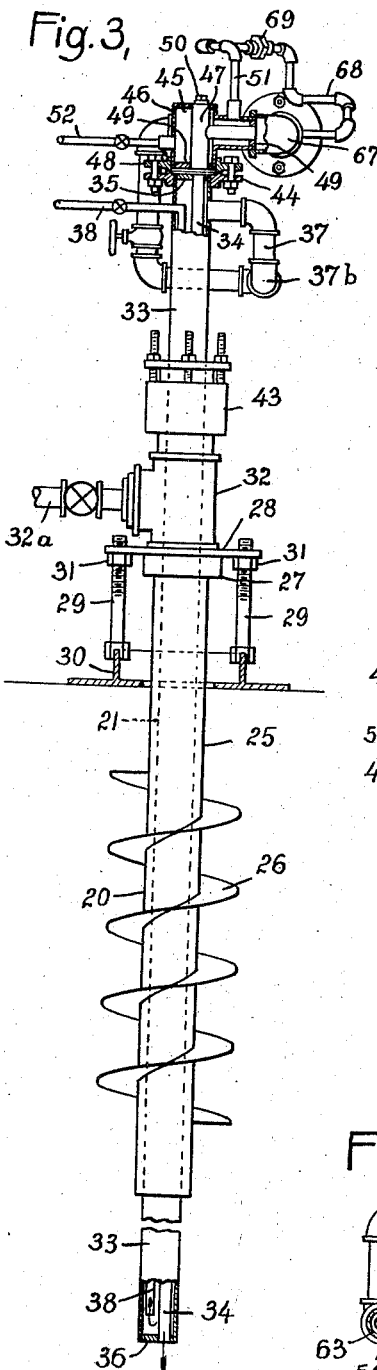
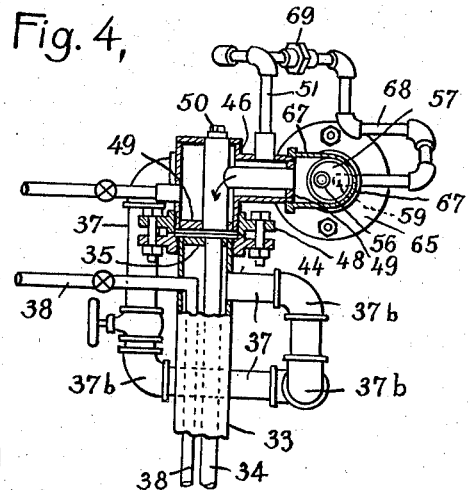
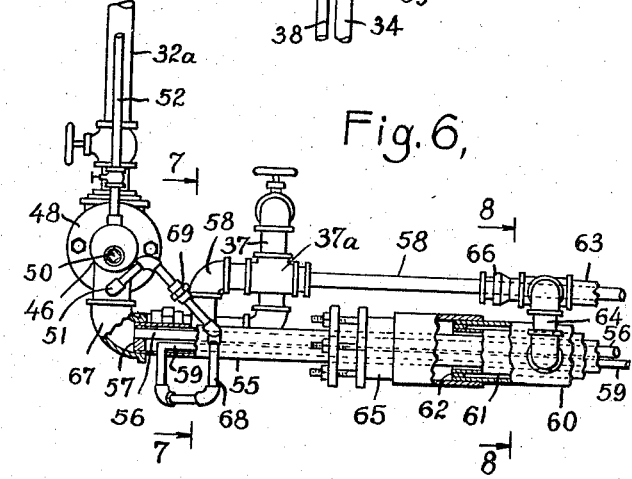
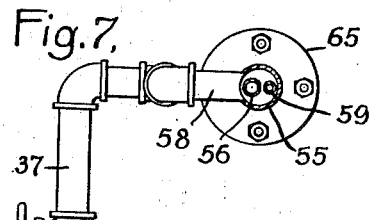
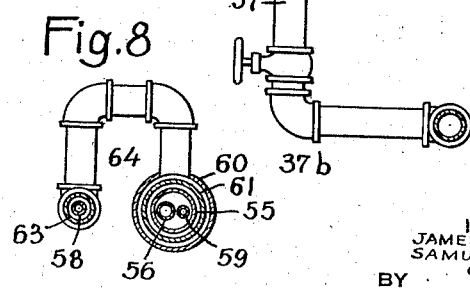
INVENTOR
JAMES W. SCHWAB
SAMUEL FORDE POWELL
GUY SMITH
BY
ATTORNEYS

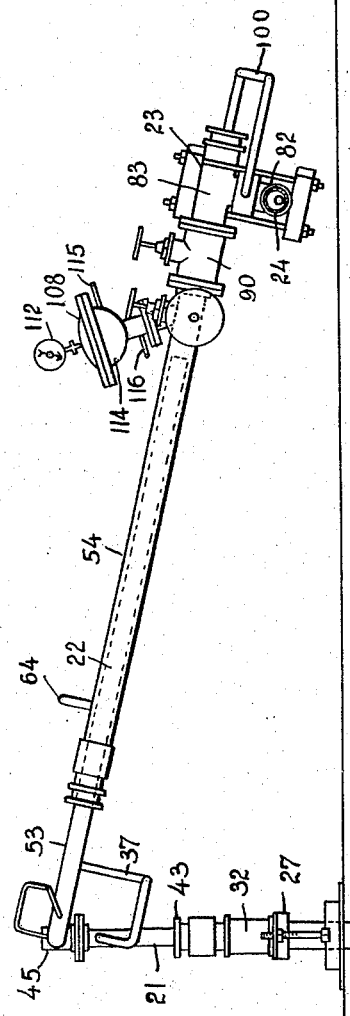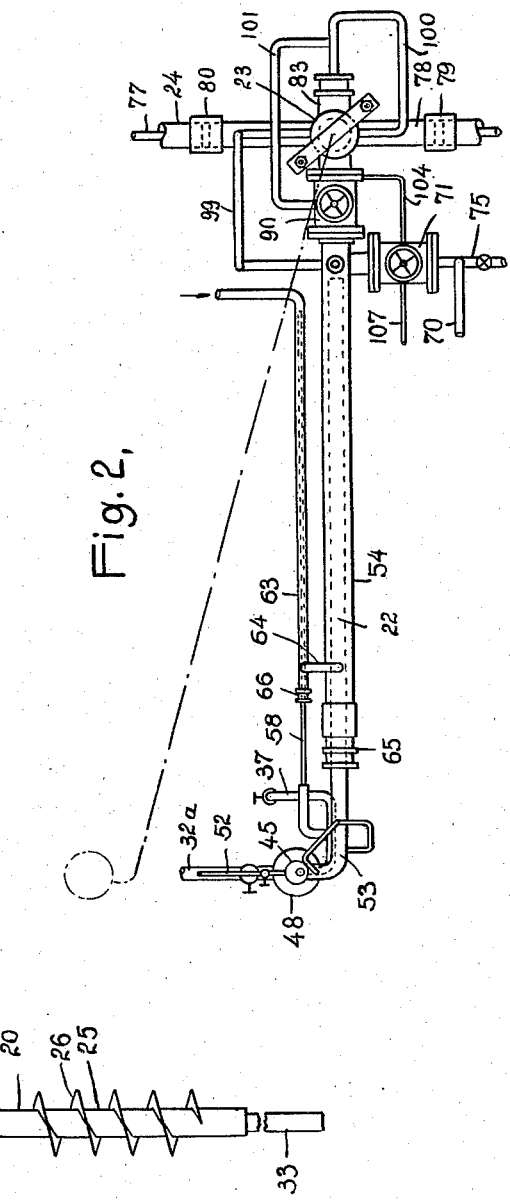

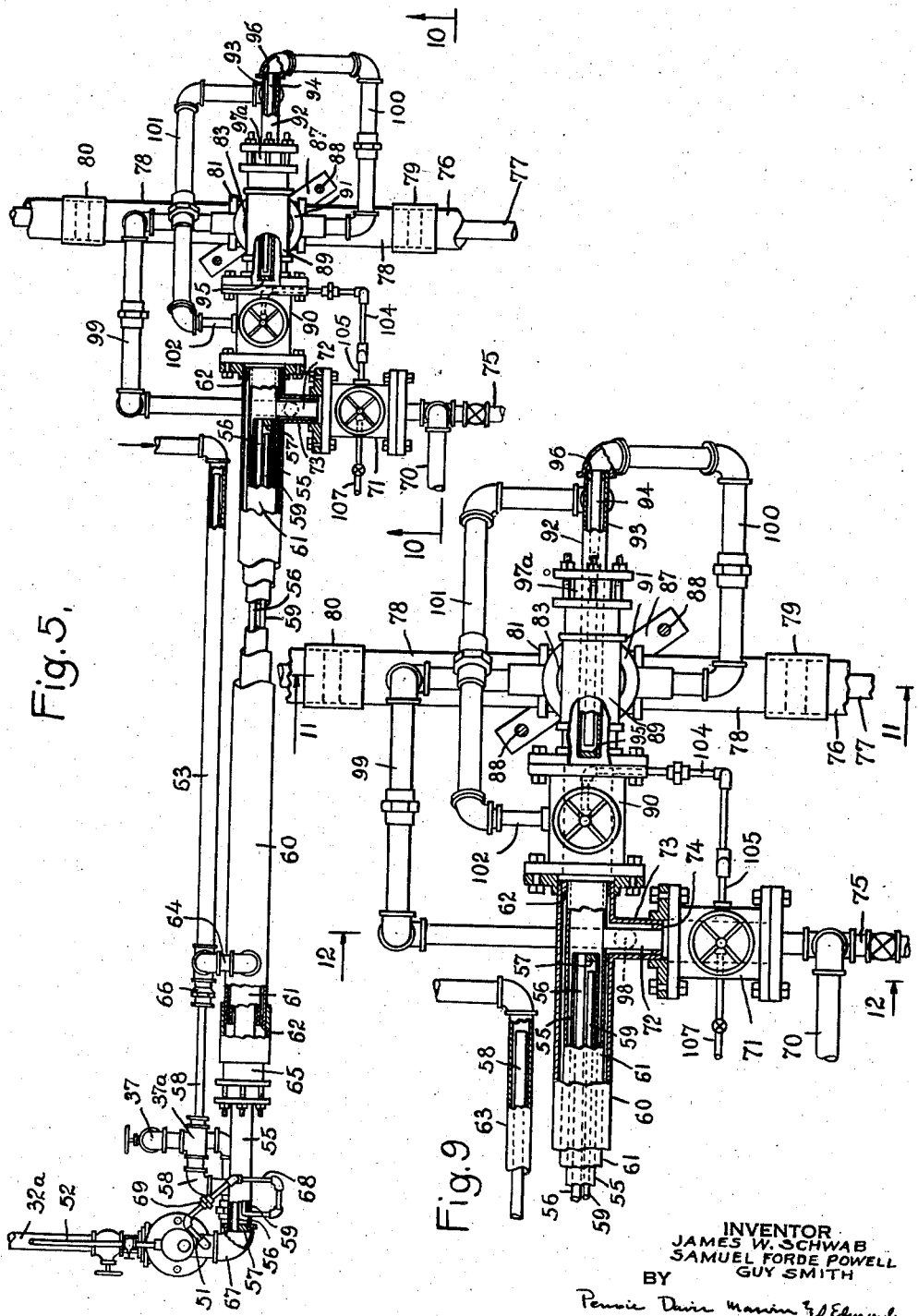

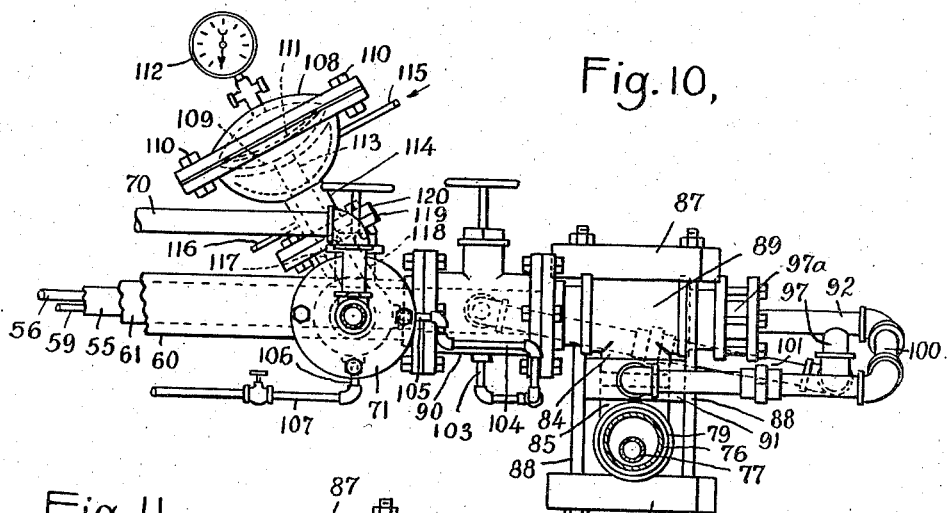
Fig. 10,
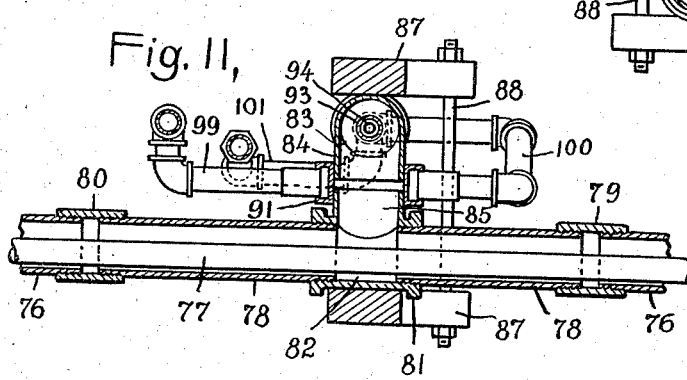
Fig. 11,
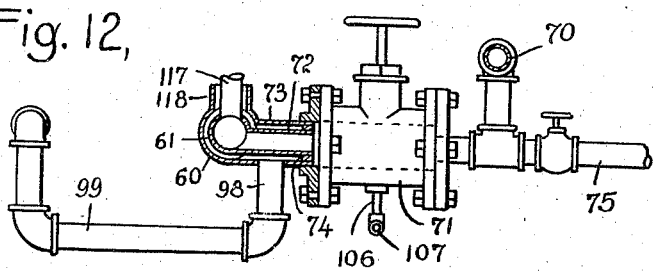
Fig. 12,
INVENTOR
JAMES W. SCHWAB
SAMUEL FORDE POWELL
GUY SMITH
BY
ATTORNEYS June 11, 1940.   J. W. SCHWAB ET AL   2,203,881
SOLIDIFICATION OF SANDY SOILS
Filed Dec. 2, 1937   5 Sheets-Sheet 5
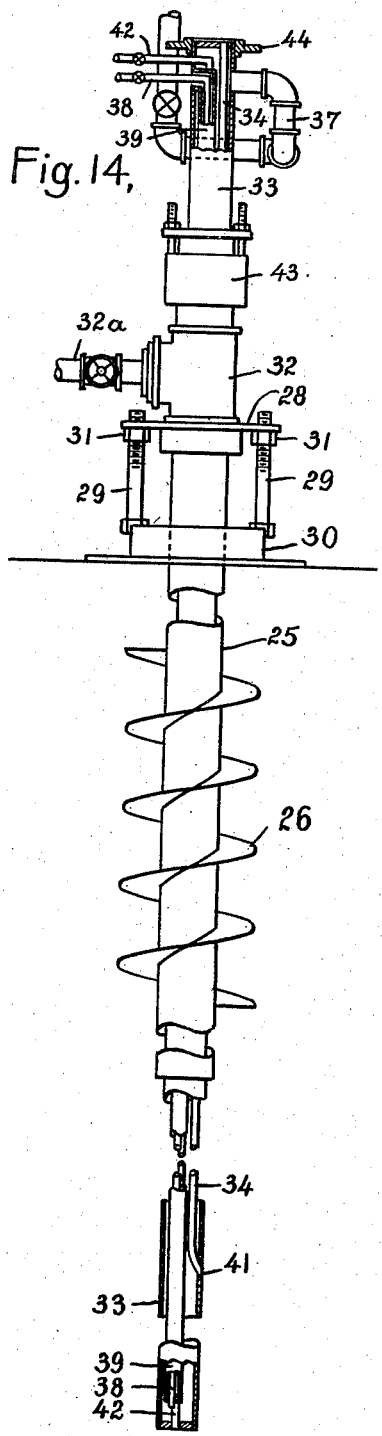
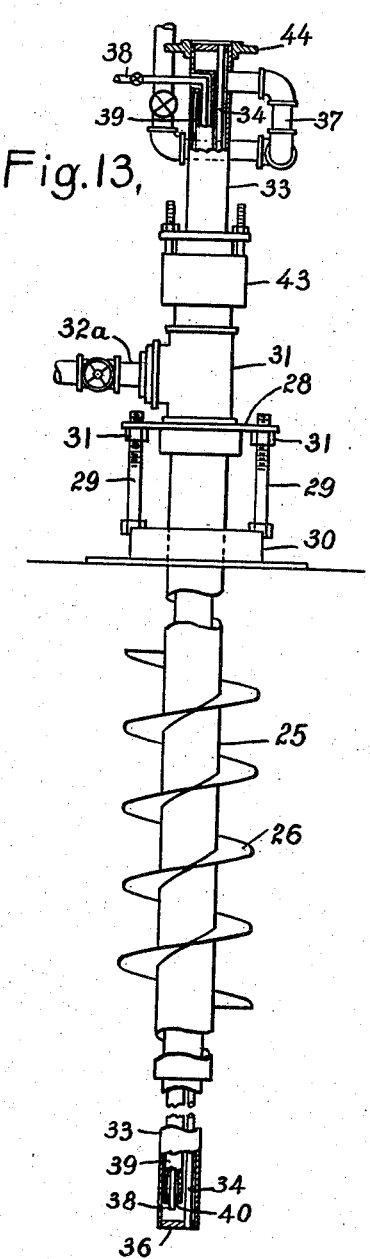
INVENTOR
JAMES W. SCHWAB
SAMUEL FORDE POWELL
GUY SMITH
BY
ATTORNEYS Patented June 11, 1940

2,203,881

UNITED STATES PATENT OFFICE 2,203,881

SOLIDIFICATION OF SANDY SOILS

James W. Schwab, Samuel Forde Powell, and Guy Smith, Newgulf, Tex., assignors to Texas Gulf Sulphur Company, Houston, Tex., a corporation of Texas Application December 2, 1937, Serial No. 177,756

14 Claims. (Cl. 61—63)

This invention relates to the solidification of sandy and other loose soils, and has for its principal object the provision of apparatus for use in solidifying or consolidating such soils. More particularly, the invention is concerned with the introduction of molten sulphur into sandy soils for solidifying or consolidating purposes, and provides an improved apparatus for handling molten sulphur and introducing it into sub-surface strata of sandy or other loose formations.

It has been proposed heretofore to use molten sulphur to solidify loose soils and to fill crevices in sub-surface strata, but up to the present time such proposals have not been commercially employed. To a considerable extent, this has been due to the lack of suitable equipment for injecting molten sulphur into sub-surface strata. Although molten sulphur is not corrosive and is fluid at only moderately high temperatures, it has been found difficult, with heretofore available apparatus, to cause the sulphur to penetrate properly through the stratum desired to be solidified.

Solidification of a sub-surface stratum with sulphur involves introducing molten sulphur into the stratum through a suitably cased well hole, and the sulphur, while passing down the well, must be heated in order to maintain it fluid. In consequence, the well casing and the ground immediately about the casing are unavoidably heated during the injection operation, and the sulphur discharged at the bottom of the well, instead of distributing itself properly through the cool stratum intended to be solidified, tends to return to the surface around the heated well casing. Preheating the loose stratum with steam prior to introducing the molten sulphur effectively increases the range of penetration of the molten sulphur near the point in the stratum where it is introduced, but at the same time, owing to the longer period during which the well is heated, the tendency of the molten sulphur to return to the surface about the well casing is not appreciably diminished.

The present invention provides apparatus for introducing molten sulphur into sub-surface strata that to a considerable extent at least overcomes difficulties heretofore encountered in such operations. Although the apparatus of the invention is particularly well suited for introducing molten sulphur into sub-surface strata, it may be employed also for introducing other substances than molten sulphur underground, and for other purposes requiring apparatus of the type provided by the invention.

The apparatus of the invention comprises a combination of units for conveying molten sulphur or the like from a fixed source to the place where the sulphur is to be utilized. The units making up the complete apparatus of the invention comprise a cylindrical casing for insertion into a well, a steam-sulphur injection tube extending substantially concentrically through the casing for injecting steam and sulphur into the strata penetrated by the well, and an extensible manifold for connecting the injection tube with the source of molten sulphur.

The casing comprises a cylindrical casing member having a spiral (helical) packer element formed about and secured to the exterior of the casing member. A jack, comprising a jack plate secured to the upper end of the cylindrical casing member and one or more jack screws adapted to bear against the ground and press upwardly against the jack plate, is provided for wedging the casing with its packer tightly in the well.

The steam-sulphur injection tube comprises a cylindrical heating jacket adapted to extend substantially concentrically through the cylindrical casing. A steam-sulphur conduit extends longitudinally through the heating jacket in spaced, non-communicating relationship with the interior thereof, means are provided for introducing steam into the heating jacket, and a condensate bleeder extends longitudinally through the interior of the heating jacket from a point adjacent the top to a point near the bottom thereof for the purpose of withdrawing condensate from the heating jacket. Preferably, an insulating jacket surrounding but spaced from the condensate bleeder encloses the latter substantially from one end to the other to provide a dead air space immediately about the bleeder. If desired, a wash line may extend through the heating jacket for the purpose of supplying water to wash the injection tube unit into sandy soil.

The steam-sulphur manifold is an extensible assembly comprising inner and outer telescoping elements. The outer element comprises a jacket having a steam-sulphur conduit extending longitudinally therethrough in spaced, non-communicating relationship with the interior thereof. A separate steam supply conduit and means connecting it with the interior of the jacket also are provided. The inner element of the manifold comprises a tubular jacket through which a steam-sulphur conduit extends in spaced, non-communicating relationship with the interior thereof. A separate steam supply conduit is suitably connected with the jacket of the inner element for the purpose of supplying steam thereto, and a condensate bleeder extending through the interior of the jacket serves to remove condensate and uncondensed steam therefrom.

The jacket of the inner element telescopes within the steam-sulphur conduit of the outer element, and the steam supply conduit of the inner element telescopes within the steam supply conduit of the outer element. A packing gland secured to the jacket of the outer element is packed against the jacket of the inner element, and another packing gland secured to the steam supply conduit of the outer element is packed against the steam supply conduit of the inner element. These packing glands serve to prevent leakage of sulphur and steam from the manifold without interfering with its extensibility.

The steam-sulphur conduit of the inner element of the telescoping manifold assembly is connected to the steam-sulphur conduit of the injection tube unit, and means are provided for connecting the steam-sulphur conduit of the outer element of the manifold with a supply of steam and also with a source of molten sulphur.

The means by which the steam-sulphur conduit of the outer element of the manifold is connected with the source of sulphur preferably comprises a sulphur conduit connected with the source and having a portion turnable about its axis. The run of a T is connected in the turnable section of the sulphur conduit, and a second T is clamped to the first with its outlet bearing against the outlet of the T in the turnable section of the sulphur conduit. Steam jacketed valve means connect the run of the second T with the steam-sulphur conduit of the outer element of the manifold unit. Advantageously, an annular steam jacket surrounds adjacent portions of the outlets of the two T's, and a steam gut line extends into the run of the second T. Means are provided for supplying steam to the jacket of the valve means, the jacket surrounding the outlet of the T's, and the gut line.

The nature of the apparatus will be better understood from the following detailed description considered in connection with the accompanying drawings, in which:

Fig. 1 is an elevation of the apparatus of the invention in its preferred complete form;

Fig. 2 is a plan view of the apparatus shown in Fig. 1;

Fig. 3 is an elevation of the casing assembly with the injection tube assembly, shown partially in section, extending therethrough;

Fig. 4 is an enlarged view of the upper end of the injection tube assembly shown in Fig. 3;

Fig. 5 is a plan view, partially in section, of the steam-sulphur manifold assembly and the means by which it is connected to the injection tube assembly and to a source of molten sulphur;

Fig. 6 is an enlarged view of the end of the steam-sulphur manifold assembly connected to the injection tube assembly;

Fig. 7 is a cross-section of the manifold assembly taken substantially along the line 7—7 of Fig. 6;

Fig. 8 is a cross-section of the manifold assembly taken substantially along the line 8—8 of Fig. 6;

Fig. 9 is an enlarged view of the means by which the manifold assembly is connected to a source of molten sulphur;

Fig. 10 is a cross-section taken substantially along the line 10—10 of Fig. 5, showing in elevation the means by which the manifold assembly is connected to a source of steam and a source of molten sulphur;

Fig. 11 is a cross-section taken substantially along the line 11—11 of Fig. 9;

Fig. 12 is a view taken substantially along the line 12—12 of Fig. 9;

Fig. 13 is an elevation similar to Fig. 3, showing partially in section a modified form of an injector tube assembly; and Fig. 14 is a view similar to Fig. 13, but showing partially in section still another form of an injector tube assembly.

The preferred complete apparatus of the invention shown in Figs. 1 and 2 comprises a casing unit 20, an injection tube unit 21, an extensible manifold 22, and means 23 connecting the manifold with a conduit 24 leading from a source of molten sulphur.

The casing unit, shown in detail in Fig. 3, comprises a cylindrical casing member 25 having a spiral (helical) packer element 26 formed thereabout and secured thereto. The casing may be introduced into a well drilled approximately to the outer diameter of the casing member 25 by inserting it therein up to the lower end of the spiral packer 26 and then feeding it down by a screwing operation.

A jack 27 is provided for wedging the casing securely in the well after insertion. The jack comprises a jack plate 28 mounted on the casing adjacent the upper end thereof and jack screws 29 adapted to bear against the ground and press upwardly against the jack plate. As shown in the drawings, the jack screws do not bear directly against the ground, but are supported on an annular ring 30 surrounding the casing, the ring itself being supported by the ground or by a suitable foundation placed on the ground. The jack screws are provided with nuts 31 engaging with the jack plate 28. By turning up on the nuts 31, an upwardly acting force is exerted on the jack plate and on the casing on which it is mounted. With the casing and its spiral packer screwed into the well, jacking up the casing in this manner wedges the packer and the casing member to which it is secured very tightly in the well.

The casing may be provided with a T 32 at its upper end for connection to a wash line 32a. Such provision may be desirable for the purpose of washing the casing into sandy soil during installation thereof.

The injection tube unit 21 that extends through the casing 20 comprises a tubular jacket 33 through which a steam-sulphur conduit 34 passes. The steam-sulphur conduit does not communicate with the interior of the jacket, being sealed therefrom at either end by plugs 35, 36. A valved steam pipe 37 connected to the jacket serves for introducing steam into the jacket. A suitably valved condensate bleeder 38 extends through the jacket 33 from a point adjacent the upper end to near the lower end thereof for the purpose of withdrawing condensate from the jacket.

In operation, the injection tube unit 21 extends through the casing unit 20 to a point that may be considerably below the lower end of the casing (the casing unit is essentially surface equipment and ordinarily does not extend very deeply into a well). Steam admitted to the jacket 33 of the injection tube unit through the steam pipe 37 maintains sulphur passing through the steam-sulphur conduit 34 in a fluid condition during its passage down the well, and the pressure of the steam in the jacket forces condensate forming therein out through the bleeder pipe 38.

If the well is particularly deep and the injection tube is of considerable length, hot steam admitted to the jacket of the injection tube near the upper end thereof tends to vaporize condensate in the upper end of the bleeder, resulting in the discharge of steam from the bleeder and loss of heat from the jacket. The lower end of the injection tube unit particularly is apt to be cooled by such an occurrence. For wells extending more than a short distance underground, therefore, it is desirable to enclose the condensate bleeder 38 in an insulating jacket 39 (Fig. 13) surrounding but spaced from the condensate bleeder for the substantially entire length thereof. The annular space between the bleeder 38 and the insulating jacket 39 is closed to the admission of steam from the interior of the jacket by means of a plug 40 at the lower end of the insulating jacket. A dead air space thus is provided immediately about the condensate bleeder, with the result that the bleeder is insulated from the heat of the steam admitted to the jacket and the tendency for the condensate passing out through the bleeder to be vaporized is minimized.

The steam-sulphur conduit 34 passing through the jacket 33 of the injection tube unit is shown in Figs. 3 and 13 as opening to the exterior of the jacket at the lower end thereof. It may be desired, in some instances, to discharge sulphur from the injection tube at a point somewhat above the lower end of the injection tube unit. In such cases, the steam-sulphur conduit 34 of the injection tube unit may open to the exterior of the jacket 33 through an opening 41 in a wall of the jacket at a point somewhat above the lower end thereof (Fig. 14). This arrangement is particularly advantageous when the injection tube unit is to be washed into a sandy strata during injection of steam or molten sulphur or between sulphur injections. For such operation, the injector tube unit may include a suitably valved wash line 42 extending through the interior of the jacket from a point adjacent the upper end to the lower end thereof. The wash line 42 provides for supplying water to wash the injection tube unit deeper into loose strata.

The injection tube 21 may be inserted into the casing 20 through a packing gland 43. The presence of such a packing gland is necessary if water is admitted to the annular space between the cylindrical casing member 25 and the jacket 33 of the injection tube unit, for the purpose of washing the casing into the ground, with the injection tube in place. The packing gland 43 also serves to prevent molten sulphur from return to the surface through the space between the injection tube unit and the interior of the casing.

The upper end of the jacket 33, which forms the outer element of the injection tube unit, is fitted with a flange 44 for coupling a suitable header 45 to the injection tube unit. The header 45 advantageously comprises a jacket member 46 in the form of a T, within which is mounted a steam-sulphur T conduit 47. A flange 48 secured to the header jacket 46 provides for bolting the header to the flange 44 of the injection tube unit. The steam-sulphur T conduit 47 in the header is blocked from communication with the interior of the header jacket 46 by suitable closure plugs 49. The T conduit 47 opens to the exterior of the header, however, so that, with the header in position on the injection tube unit, steam or sulphur passing into the T conduit may discharge therefrom into the steam-sulphur conduit 34 of the injector tube unit. A plug 50 may be provided in the T conduit 47 so that access may be had to the interior of the T conduit 47 and the interior of the steam-sulphur conduit 34 without detaching the header from the injection tube assembly. A pipe 51 serves to admit steam or hot water to the interior of the jacket of the header, and a valved bleeder 52 permits withdrawal of such heating medium after passage through the header jacket.

The steam-sulphur manifold (Figs. 5 to 8) through which steam and molten sulphur are admitted to the injection tube through the header 45 comprises inner and outer telescoping members 53 and 54. The telescoping nature of the manifold assembly renders it extensible, which characteristic is necessary in order to permit jacking of the casing as described above without disconnecting the manifold. When the casing is jacked up a few inches, the length of the manifold must be increased somewhat in order to avoid bending or straining the injection tube unit, and this lengthening is permitted by the extensible nature of the telescoping manifold. The extensibility of the manifold also is of value when it is desired to add sections to the injection tube unit, for the addition of such sections necessitates a longer manifold. The telescoping nature of the manifold also permits the injection tube to be washed deeper into the well without detaching the manifold or placing the injection tube under strain because, as the injection tube passes downwardly, the manifold telescopes and shortens to the extent required.

The inner member 53 of the manifold comprises a jacket member 55 through the interior of which a steam-sulphur conduit 56 extends in spaced relationship with the walls of the jacket. The steam-sulphur conduit is blocked from communication with the interior of the jacket 55 by suitable closure plugs 57 at either end. A steam supply line 58 connects with the jacket 55 and serves to admit steam thereto. A steam and condensate return line 59 extends through the jacket 55 from a point adjacent one end nearly to the other end thereof. The supply line and condensate return line are so arranged that steam admitted to the jacket 55 through the supply line 58 must pass substantially the length of the jacket 55 and then returned through the return line 59. In this manner, the steam-sulphur line 56 of the inner telescoping member is kept heated throughout its length so that there will be no danger of sulphur freezing therein.

The outer telescoping member 54 of the manifold comprises a jacket 60 through the interior of which a steam-sulphur conduit 61 extends in substantially concentric, spaced relation. The steam-sulphur conduit 61 is blocked at each end from communication with the annular space between it and the jacket by suitable annular closure plugs 62. A separate steam supply line 63 extending substantially parallel to the jacket 60 communicates with the interior of the jacket through a suitable cross-over pipe 64.

In the assembled manifold, the jacket 55 of the inner element telescopes into the steam-sulphur conduit 61 of the outer element and the steam supply line 58 of the inner element telescopes into the steam supply line 63 of the outer element. A packing gland 65 secured to the jacket 60 of the outer element is packed against the jacket 55 of the inner element to form a sealed union between these two members. A similar packing gland 66 secured to the steam supply line 63 packs against the steam supply line 58 of the inner element.

The manifold assembled as described above is extensible by virtue of the telescoping inner and outer elements. The jacket 55 of the inner element slides in the steam-sulphur conduit 61 of the outer element, and the steam supply line 58 of the inner element slides correspondingly in the steam supply line 63 of the outer element. Steam or sulphur admitted to the steam-sulphur conduit 61 of the outer unit may discharge therefrom only through the steam-sulphur conduit 56 of the inner unit, for access to the interior of the jacket 55 of the inner unit is prevented by the plugs 57, and escape of steam or sulphur from the steam-sulphur conduit 61 of the outer unit is prevented by the packing gland 65.

Steam entering the steam supply line 63 passes in part through the annular space between the line 63 of the outer element and the line 58 of the inner element and through the cross-over connection 64 into the jacket 60 of the outer unit, and in part through the steam supply line 58 of the inner unit into the jacket 55 thereof. The escape of steam from the steam supply line 63 of the outer element is prevented by the packing gland 66. Thus, the steam-sulphur conduits 56 and 61 of the inner and outer elements provide only a single path for the passage of steam or sulphur admitted to the conduit of the outer (or inner) element, and steam is supplied at all times to the jackets 55 and 60 of both elements, regardless of the degree to which the manifold is extended.

The amount by which the manifold may be lengthened is governed only by the length of its component elements. With a manifold such as that shown and described, having two telescoping elements, the maximum length of the manifold is somewhat less than twice its minimum length.

The inner unit of the telescoping manifold assembly is connected with the header 45 of the injection tube unit in order to deliver steam or sulphur supplied to the manifold to the injection tube. As shown in the drawings, this connection is made simply by means of an elbow 67 connected to the end of the jacket 55 of the inner unit of the manifold and to the outlet portion of the T-shaped header 45. Because of the closure plugs 57 and 49, only material passing through the steam-sulphur conduit 56 of the inner unit of the manifold may discharge into the elbow, and this material may discharge from the elbow only into the steam-sulphur T conduit 47 of the header. The elbow 67 is connected to the jacket 55 by means of engaging screw threads or in any other suitable manner. Connection of the elbow 67 to the outlet portion of the jacket 46 of the header 45 also may be by means of engaging screw threads, or by other means permitting the elbow to be turned in a plane perpendicular to the axis of the outlet portion of the header jacket 46.

Preferably, the steam or condensate discharging from the jacket 55 of the inner unit of the manifold assembly passes into a discharge pipe 68 connected by means of a union 69 to the supply line 51 feeding the interior of the jacket 46 of the injection tube header 45. In this manner, the steam or hot condensate passing from the jacket 55 of the inner unit of the manifold is utilized to maintain the required temperature in the jacket 46 of the header before being discharged through the bleeder 52. The union 69 furnishes a convenient means for connecting the discharge line 68 and the supply line 51 after connecting the inner unit of the manifold assembly to the header by means of the elbow 67.

The elbow 67 is not jacketed in the apparatus shown in the drawings because it is quite short and the loss of heat therefrom is small. The danger of sulphur solidifying in this elbow is not great enough to warrant, in ordinary installations, the trouble necessary to provide this member with a jacket.

The valved steam pipe 37 through which steam is admitted to the jacket 33 of the injection tube assembly connects through a T 37a with the steam supply line 58. Elbows 37b in the steam pipe 37 accommodate the slight turning moments imposed thereon when the injection tube assembly is raised or lowered in the well.

Suitable means are provided for admitting steam and for admitting sulphur to the steam-sulphur conduit 61 of the outer element of the telescoping manifold assembly (Figs. 5 and 9 to 11). Steam is admitted to this conduit from a supply line 70 (Figs. 5, 9 and 12) through a jacketed steam supply control valve 71. The steam supply line 70 feeds directly into the control valve 71 on one side thereof, and on the other side the valve is connected by means of a conduit 72 with the steam-sulphur conduit 61 of the outer element of the manifold. The conduit 72 is enclosed in a jacket 73 communicating with the interior of the jacket 60 of the outer unit of the manifold. The conduit 72 is blocked from communication with the interior of the jacket 73 surrounding it by means of a suitable closure plug 74. Steam thus may pass from the supply line 70 through the control valve 71 into the interior of the steam-sulphur conduit 61 of the outer element of the manifold assembly and through the manifold as described above to the injection tube unit in the well. The amount of steam passing to the well is controlled by the steam supply control valve 71.

Advantageously, a valved bleeder pipe 75 connects with the steam supply line 70 close to the point at which this line enters the valve 71, thereby to permit withdrawing condensate forming in the steam supply line and thus to avoid introducing such condensate into the steam-sulphur conduit 61.

The means by which molten sulphur is introduced into the steam-sulphur conduit 61 of the outer element of the manifold comprise a sulphur conduit 76 leading from a source of molten sulphur. A steam gut line 77 extends through the sulphur conduit 76 in order to maintain the sulphur in the conduit molten. A section 78 of the conduit 76 is so arranged as to be turnable about the axis of the conduit. Advantageously, this section 78 is connected to the remainder of the conduit 76 through suitable internally threaded couplings 79 and 80. Each coupling is in threaded engagement with an end of the turnable section 78 and an adjacent portion of the conduit 76, but one of the couplings 79 is provided with lefthand threads while the other coupling 80 is provided with righthand threads. The ends of the turnable section 78 are spaced within the couplings 79 and 80 a short distance from adjacent ends of the conduit 76, so that the section 78 may turn in either direction about its axis in a manner similar to that by which the buckle portion of a turnbuckle turns about the two screw portions thereof.

The run 81 of a lower T 82 is connected in the turnable section 78 of the sulphur conduit, and an upper T 83 is mounted on the lower T with its outlet 84 bearing against the outlet 85 of the lower T. Advantageously, a gasket of asbestos or the like is interposed between the adjacent ends of the outlets of the two T's. A T clamp comprising bars 87 and tie bolts 88 secures the two T's together. The whole assembly thus is such that it may turn in a vertical plane about the axis of the sulphur conduit 76 and, by loosening the tie bolts 88 of the T clamp, the upper T 83 may be turned in a horizontal plane about the axis of its outlet 84.

The run 89 of the upper T 83 connects with one side of a steam jacketed sulphur supply control valve 90, and the other side of this valve is connected to the outer element of the manifold assembly in such manner that a passage through the valve is provided from the interior of the upper T 83 to the interior of the steam-sulphur conduit 61 of the manifold. Molten sulphur thus may flow from the source through the conduit 76 and the turnable section 78 thereof, through the T's 82 and 83, and through the sulphur control valve 90 into the steam-sulphur conduit 61 of the outer element of the manifold assembly, thence to flow as described above through the manifold to the injection tube unit and through the injection tube unit to the point of utilization in a sub-surface stratum.

Ability of the means connecting the manifold assembly with the sulphur conduit 76 to be turned about the axis of the conduit cooperates with the extensibility of the manifold assembly to permit jacking of the casing 20 as described above, or to permit vertical movement of the injection tube unit 21 independently of the casing, without disconnecting the injection tube from the sulphur supply conduit and even without interrupting the supply of steam or sulphur to the injection tube. If the injection tube is moved vertically, for example, the turnable section 78 of the sulphur supply conduit accommodates turning moment imposed thereon and the telescoping manifold lengthens or shortens to the extent necessary. The turning moment imposed upon the elbow 67 during such movement of the injection tube unit is accommodated by the nature of the connection between the elbow and the header 45 atop the injection tube unit. Motion relative to stationary steam pipes of the steam supply line 70 and the jacket steam supply line 63 during vertical movement of the injection tube unit most conveniently is accommodated by connecting these steam supply lines to the stationary steam pipes by means of short lengths of flexible steam hose. Although it is possible to provide an all-metallic connection between the steam lines 70 and 63 and fixed steam pipes, such connection in most instances entails more expense and trouble than it is worth, for very satisfactory flexible steam hoses are available at relatively low cost.

The passage for molten sulphur through the two T's 82 and 83 and the valve 90 to the steam-sulphur conduit 61 of the outer element of the manifold assembly is sufficiently long to justify the provision of heating means for maintaining the sulphur therein molten. The steam gut line 77 extending through the sulphur conduit 76 and the turnable section 78 thereof extends through the run 81 of the lower T 82, thereby providing for maintaining this portion of the lower T hot and, as mentioned above, the sulphur supply control valve 90 is of the steam jacketed type.

In order to heat the adjoining outlets of the two T's, an annular steam jacket 91 is mounted about these members.

Sulphur in the run 89 of the upper T is maintained at an adequate temperature by means of a steam gut line 92 extending therethrough. The gut line 92 comprises a jacket 93 through substantially the entire length of which a steam line 94 extends. The inner end of the jacket 93 is closed by a plug 95, and an annular plug 96 closes the annular space between the jacket 93 and the steam line 94 at the outer end of the jacket. A short discharge conduit 97 communicates with the interior of the jacket 93 adjacent the annular plug 96 at the outer end of the jacket. Thus, steam entering the steam line 94 at the end where the latter opens to the exterior of the jacket 93 must pass through the steam line and return through the jacket before escaping through the discharge conduit 97. A packing gland 97a secured to the run 89 of the upper T 83 and packed against the jacket of the steam gut line 92 prevents the escape of sulphur from the upper T at the point of entrance of the gut line.

The steam supplied to the annular steam jacket 91, the steam gut line 92, and the jacket of the valve 90, is taken from the interior of the jacket 60 of the outer unit of the telescoping manifold assembly. As mentioned above, steam is supplied to the jacket 60 of the manifold through the steam supply line 63 and the cross-over connection 64. The cross-over connection 64 advantageously communicates with the interior of the jacket 60 at the end thereof adjacent the packing gland 65, and provision is made for withdrawing steam from the jacket 60 at the end adjacent the sulphur supply control valve 90. As shown in the drawings (Fig. 12), a short discharge conduit 98 is connected with the jacket 73 surrounding the steam conduit 72 leading from the steam supply control valve 71 to the steam-sulphur conduit 61 of the outer unit of the manifold. (As pointed out above, the jacket 73 communicates with the interior of the jacket 60 of the outer unit of the manifold assembly.)

The discharge conduit 98 is connected by means of suitable piping 99 to the annular steam jacket 91 surrounding the outlets of the T's 82 and 83. Steam passing from the annular steam jacket 91 is conducted by suitable piping 100 to the outer end of the steam gut line 92 extending into the run of the upper T 83. The discharge conduit 97 of the gut line 92 is connected by means of piping 101 to the inlet conduit 102 feeding the jacket of the sulphur supply control valve 90. Steam (and condensate) passes from the jacket of the valve 90 through a discharge conduit 103 and suitable piping 104 to the inlet conduit 105 feeding the jacket of the steam supply control valve 71. Steam and condensate escapes from the jacket of this valve through an outlet conduit 106 and a suitable valved bleeder 107.

By virtue of the piping arrangement described above, steam entering the jacket 60 of the outer unit of the manifold assembly first passes therethrough and thence to the annular jacket 91 surrounding the outlets of the T's 82 and 83. The steam from the annular jacket is conducted to the gut line 92, and it passes in through the steam line 94 and out through the annular space between this steam line and the jacket 93. The steam passes from the gut line 92 to the jacket of the sulphur supply control valve 90, and from the jacket of this valve to the jacket of the steam supply control valve 71. Condensate and such steam as remains uncondensed is discharged from the jacket of the latter valve through the bleeder 107. By controlling the valve in the bleeder 107, the rate of flow of steam into the jacket 60 of the outer unit and through succeeding heating elements to the jacket of the steam supply control valve 71 may be governed within the necessary limits.

In operating the apparatus of the invention, it is desirable to know the pressure at which steam or sulphur is being forced through the manifold assembly and into the injection tube unit. To this end, a suitable pressure gauge advantageously is connected to the outer element of the manifold assembly adjacent the points of connection thereof to the steam supply control valve 71 and the sulphur supply control valve 90. A suitably connected pressure gauge unit is shown in Fig. 10. The gauge comprises a diaphragm chamber defined by an upper domed member 108 and a lower domed member 109. The domed members are each provided with suitable flanges and are bolted together by bolts 110 passing through these flanges. A diaphragm 111 is clamped between the flanges of the two domed members.

The space between the domed member 108 and the diaphragm 111 constitutes an oil chamber which is filled with oil, and with this chamber there is connected an oil-filled pressure gauge 112. The space between the lower domed member 109 and the diaphragm 111 constitutes a steam-sulphur chamber into which steam or sulphur is admitted through a conduit 113 from the steam-sulphur conduit 61 of the outer element of the manifold assembly. The steam-sulphur chamber defined by the lower domed member 109 and the diaphragm 111, and the conduit 113, are enclosed by a steam jacket 114, into which steam is admitted from a suitable source through an inlet tube 115 and from which steam or condensate is withdrawn through a discharge tube 116.

For convenience in attaching the above-described pressure gauge unit to the manifold, the manifold itself may be provided with a T-type connection comprising an inner steam-sulphur conduit 117 connected with the steam-sulphur conduit 61 of the outer element of the manifold assembly. An outer jacket 118 surrounds the conduit 117 and connects with the interior of the jacket 60 of the outer unit of the manifold assembly. The above-described T-type connection conveniently is provided with a flange 119 adapted to be bolted to a corresponding flange 120 secured to the steam jacket 114 about the conduit 113 of the pressure gauge assembly. An annular plug (not shown) preferably is mounted adjacent the flange 119 between the steam-sulphur conduit 117 and the jacket 118 of the T connection member for the purpose of closing the annular space between the conduit and the jacket, thus preventing the escape of manifold jacket steam into the jacket of the pressure gauge assembly and out through the bleeder 116.

The pressure gauge assembly described above serves very well for the purpose of indicating the pressure of steam or molten sulphur being introduced into the well. Of course, other types of pressure gauges than that described above may be employed if desided, but it is important, in order to have accurate pressure readings, to provide means for maintaining the steam or sulphur in the pressure gauge in a properly heated condition. This is accomplished by the heating jackets. It is also desirable to employ a pressure gauge such as that described above in which the steam, and especially the molten sulphur, does not actually penetrate the workings of the gauge itself. In the above-described gauge assembly, oil only enters the gauge 112. The oil is separated mechanically from the steam or molten sulphur by the diaphragm 111, but the pressure of the oil depends upon the pressure of the steam or molten sulphur transmitted to it through the diaphragm.

Apparatus constructed in accordance with the invention is very well suited for the purpose of introducing molten sulphur or similar substances required to be heated into sub-surface strata. The casing, with its spiral packer and jack, is such as to greatly reduce the chances for molten sulphur injected into the ground below the casing to return to the surface of the ground immediately about the casing. The extensible manifold and the means by which it is connected to the sulphur source and to the injection tube permits jacking of the casing, as well as other operations involving vertical motion of the injection tube, to be performed without disconnecting any of the apparatus through which molten sulphur or steam is supplied to the injection tube and without imposing any strain on the injection tube. Conduits through which steam and sulphur pass on their way to the point of utilization underground are adequately jacketed throughout the apparatus to insure maintenance of proper temperatures. The apparatus is made up for the most part of readily available piping and pipe fittings, and can be constructed without particular difficulty or expense. After the casing has been inserted into a well, the apparatus of the invention can be assembled and made ready for use quickly and easily.

We claim:

1. Apparatus for injecting molten sulphur underground comprising a cylindrical casing for insertion into a well, a steam-sulphur injection tube extending substantially concentrically through the casing, and an extensible manifold comprising a pair of telescoping conduits for connecting the injection tube with a source of molten sulphur.

2. Apparatus for injecting molten sulphur underground comprising a cylindrical casing for insertion into a well, a steam-sulphur injection tube extending substantially concentrically through the casing and comprising a cylindrical jacket having a steam-sulphur conduit extending longitudinally therethrough in non-communicating relationship therewith, and an extensible manifold connecting the injection tube with a source of molten sulphur, said manifold comprising a pair of telescoping tubular elements each comprising a cylindrical jacket having a steam-sulphur conduit extending therethrough.

3. Apparatus for injecting molten sulphur underground including a casing for insertion into a well comprising a cylindrical casing member having a spiral packer element formed about the exterior thereof for insertion into a well, a jack for wedging the casing tightly in the well comprising a jack plate secured to the upper end of the casing and jack screws adapted to bear against the ground and press upwardly against the jack plate, a steam-sulphur injection tube unit extending substantially concentrically through the casing and comprising a cylindrical heating jacket, a steam-sulphur conduit extending longitudinally through the jacket in non-communicating relationship with the interior thereof, a condensate bleeder extending longitudinally through the jacket from a point adjacent the top thereof to a point near the bottom thereof, and an insulating jacket surrounding the condensate bleeder in spaced relation therewith throughout substantially the entire length thereof, means for introducing steam into the heating jacket of the injection tube unit, an extensible steam-sulphur manifold for introducing steam and sulphur into the steam-sulphur conduit of the injection tube comprising inner and outer telescoping tubular elements, said inner element comprising a cylindrical heating jacket, a steam-sulphur conduit extending longitudinally through the interior of said heating jacket in non-communicating relationship therewith, and a steam and condensate return line extending longitudinally through said heating jacket from a point adjacent one end thereof to a point adjacent the other end thereof, and said outer element comprising a cylindrical heating jacket having a steam-sulphur conduit extending substantially concentrically therethrough in non-communicating relationship with the interior thereof, said inner element telescoping within the steam-sulphur conduit of said outer element, means comprising telescoping steam conduits for introducing steam into the heating jackets of said inner and outer elements, means connecting the steam-sulphur conduit of said inner element with the steam-sulphur conduit of the injection tube, means for introducing steam into the steam-sulphur conduit of the outer element, and means for introducing molten sulphur into the steam-sulphur conduit of the outer element from a source of sulphur comprising a cylindrical sulphur conduit having a section thereof turnable about its axis, a lower T having its run connected in said turnable section of the sulphur conduit, an upper T having its outlet bearing against the outlet of the lower T, a steam jacket surrounding adjacent portions of the outlets of the two T's, a steam gut line extending into the run of the upper T, steam-jacketed valve means connecting the run of the upper T with the steam-sulphur conduit of the outer telescoping element, and means for introducing steam into the steam jacket about the outlets of the T's, the jacket of the valve means, and the gut line.

4. Apparatus of the class described comprising a casing assembly for insertion into a well comprising a cylindrical casing member having a spiral packer element formed about and secured to the exterior thereof, and a jack for wedging the casing tightly in the well comprising a jack plate secured to the upper end of the cylindrical casing member and a jack screw adapted to bear against the ground and press upwardly against the jack plate.

5. Apparatus of the class described comprising a steam-sulphur injection tube assembly comprising an outer tubular jacket, a steam-sulphur conduit extending longitudinally through said jacket in non-communicating relationship with the interior thereof and spaced from the wall thereof, means for introducing steam into the space in said jacket between the wall thereof and the conduit, a condensate bleeder extending through the jacket from a point adjacent the upper end thereof to a point near the lower end thereof, and an insulating jacket surrounding but spaced from the condensate bleeder for substantially the entire length thereof.

6. Apparatus of the class described comprising a steam-sulphur injection tube assembly comprising an outer tubular jacket, a steam-sulphur conduit extending longitudinally through said jacket in non-communicating relationship with the interior thereof and opening to the exterior of the jacket at a point above the lower end thereof, and a wash line extending through the interior of the jacket and opening to the exterior of the jacket at a point adjacent the lower end thereof.

7. Apparatus of the class described comprising a steam-sulphur injection tube assembly comprising an outer tubular jacket, a steam-sulphur conduit extending longitudinally through said jacket in non-communicating relationship with the interior thereof, a wash line extending longitudinally through the jacket and opening to the exterior of the jacket at a point adjacent the lower end thereof, means for introducing steam into the jacket, a condensate bleeder extending through the jacket from a point adjacent the upper end thereof to a point near the lower end thereof, and an insulating jacket surrounding but spaced from the condensate bleeder for substantially the entire length thereof.

8. Apparatus of the class described comprising an extensible steam-sulphur manifold assembly comprising telescoping tubular elements, each element comprising an outer cylindrical jacket and a steam-sulphur conduit extending therethrough in non-communicating relationship with the interior thereof.

9. Apparatus of the class described comprising an extensible steam-sulphur manifold assembly comprising telescoping tubular elements, each element comprising an outer tubular jacket having a steam-sulphur conduit extending longitudinally therethrough in non-communicating relationship with the interior thereof, and means comprising telescoping steam supply conduits for introducing steam into each jacket.

10. Apparatus of the class described comprising an extensible steam-sulphur manifold comprising inner and outer telescoping elements, said inner element comprising a tubular jacket, a steam sulphur conduit extending longitudinally therethrough in non-communicating relationship with the interior thereof, and a steam and condensate return line extending through the jacket from a point adjacent one end to a point near the other end thereof, and said outer element comprising a tubular jacket having a steam-sulphur conduit extending longitudinally therethrough in non-communicating relationship with the interior thereof, said inner element telescoping within the steam-sulphur conduit of the outer element, and a packing gland secured to the outer element and packed against the inner element.

11. Apparatus of the class described comprising an extensible steam-sulphur manifold comprising telescoping steam jackets and separate telescoping steam conduits for introducing steam into each of the telescoping steam jackets.

12. In apparatus of the class described, an extensible steam-sulphur manifold comprising inner and outer telescoping elements, said outer element comprising a tubular jacket having a steam-sulphur conduit extending longitudinally therethrough in non-communicating relationship with the interior thereof, a separate steam supply conduit, and means connecting said steam supply conduit with said jacket, and said inner element comprising a jacket having a steam-sulphur conduit extending longitudinally therethrough in non-communicating relationship with the interior thereof, a separate steam supply conduit, and means connecting said steam supply conduit with said jacket, the jacket of said inner element telescoping within the steam-sulphur conduit of said outer element, and the steam supply conduit of said inner element telescoping within the steam supply conduit of said outer element.

13. In apparatus of the class described including a steam-sulphur conduit and a source of molten sulphur, means for connecting the source of sulphur with the steam-sulphur conduit comprising a sulphur conduit communicating with the source of molten sulphur and having a section thereof turnable about its axis, a lower T having its run connected in the turnable section of the sulphur conduit, an upper T having its outlet bearing against the outlet of the lower T, a clamp holding the two T's together, and means connecting the run of the upper T with the steam-sulphur conduit.

14. In apparatus of the class described including a steam-sulphur conduit and a source of molten sulphur, means for connecting the source of molten sulphur with the steam-sulphur conduit comprising a sulphur conduit communicating with the source of molten sulphur and having a section turnable about its axis, a lower T having its run connected in the turnable section of the sulphur conduit, an upper T having its outlet bearing against the outlet of the lower T, a clamp holding the two T's together, a steam jacket surrounding adjacent portions of the outlets of the two T's, a gut line extending into the run of the upper T, steam-jacketed valve means connecting the run of the upper T with the steam-sulphur conduit, and means for introducing steam into the jacket of the valve means, the jacket surrounding the outlets of the T's, and the gut line.

JAMES W. SCHWAB.
SAMUEL FORDE POWELL.
GUY SMITH.